United States Patent [19]

Liu et al.

[11] 3,984,387

[45] Oct. 5, 1976

[54] PREPARATION OF LINEAR α-OLEFIN POLYMERS HAVING ULTRA HIGH MOLECULAR WEIGHT

[75] Inventors: Gordon Y. T. Liu; Donald R. Smith, both of Baton Rouge, La.

[73] Assignee: The Dow Chemical Company, Midland, Mich.

[22] Filed: Aug. 7, 1974

[21] Appl. No.: 495,476

[52] U.S. Cl. .................................. 526/74; 526/153; 526/159; 526/352; 526/905
[51] Int. Cl.² ........................................ C08F 110/02
[58] Field of Search .............. 260/94.9 CA, 94.9 C, 260/93.7, 88.2 B, 88.2 R

[56] References Cited
FOREIGN PATENTS OR APPLICATIONS
991,397   5/1965   United Kingdom

*Primary Examiner*—Paul R. Michl
*Attorney, Agent, or Firm*—M. S. Jenkins

[57] ABSTRACT

Ultra high molecular weight, linear α-olefin polymers are produced without reactor fouling by polymerizing an α-olefin in the presence of Ziegler catalyst dispersed in an inert diluent and an amount of an inert gas not in excess of that which will dissolve in the inert liquid diluent.

6 Claims, No Drawings

PREPARATION OF LINEAR α-OLEFIN POLYMERS HAVING ULTRA HIGH MOLECULAR WEIGHT

BACKGROUND OF THE INVENTION

This invention relates to improved low pressure polymerization processes for preparing linear α-olefin polymers having ultra high molecular weight.

The low pressure polymerization of α-olefins with catalyst systems composed of a partially reduced, heavy transition metal component and an organo-metallic reducing component to form high density, solid, linear polymers is well known. Characteristically, the α-olefin is contacted under relatively mild conditions of pressure and temperarture in a inert hydrocarbon diluent.

In such polymerization process, it is very important to maintain constant reaction conditions, such as temperature and pressure, in order to obtain a high percentage conversion of monomer to polymer. Since these polymerization processes are exothermic in nature, it is generally desirable to provide some means for transfer of bulk heat generated in the polymerization vessel. This is very frequently done by using an indirect heat exchange means in combination with the reactor, for example, by providing a jacket around the reaction vessel through which a suitable coolant is circulated. While this type of heat exchange means does provide adequate heat transfer on a bulk basis, additional control means is required to effect necessary heat transfer on macromolecular basis. Failure to provide such macromolecular heat transfer means results in the softening of the polymer particles being formed. The soft polymer particles then attach to the cooling surfaces of the reactor and cause fouling. Once fouling occurs, the overall bulk temperature of the diluent/polymer slurry cannot be easily controlled thus causing premature shutdown of the reactor.

It has been observed that the problems resulting from inadequate macromolecular heat transfer do not arise when hydrogen is introduced into the reactor in substantial amounts, i.e., generally greater than 40 mole percent based on ethylene. It is found, however, that the introduction of such amounts of hydrogen into the reactor inhibits the formation of ultra high molecular weight polymers which are desirable for many end uses. For example, British Patent No. 991,397 discloses the introduction of hydrogen or some other noncondensible gas into the reactor in sufficient quantity such that the noncondensible gas operates as a direct heat exchanger in the polymerization zone. As noted above, when hydrogen is employed as the non-condensible gas, the molecular weight of the resultant polymer is lowered significantly. On the other hand, when such noncondensible gases are employed in quantities sufficient to effect heat transfer, it is found that the reaction rate is decreased to the point that the reaction generally ceases within a short period of time.

For these reasons, it would be highly desirable to provide a continuous polymerization process for producing ultra high molecular weight linear α-olefin polymers wherein the process can be maintained at a steady state for a substantial period of time without reactor fouling.

SUMMARY OF THE INVENTION

In accordance with this invention, ultra high molecular weight linear olefin polymers are prepared by an improved process for polymerizing in a polymerization zone an α-olefin in an inert organic liquid diluent in the presence of a catalytic amount of a catalyst composition of the Ziegler type. The improvement comprises the steps of (1) introducing into the polymerization zone a inert gas in an amount sufficient to effect macromolecular heat transfer in the liquid phase of the polymerization zone but not in excess of the capacity of the diluent to absorb (solvate) at the conditions of polymerization and (2) polymerizing the α-olefin.

Surprisingly, practice of the aforementioned process enables the production of ultra high molecular weight polymers, i.e., polymers having melt flow viscosities as determined by ASTM-D-1238-65-T(E) less than 0.3 decigram/minute, without fouling of the reactor or appreciably reducing the average rate of polymerization.

The ultra high molecular weight polymers prepared in accordance with the improved process of this invention have relatively narrow molecular weight distributions. As a consequence, such polymers exhibit excellent physical properties such as impact strength, tensile strength and the like. Such polymers are very useful in the fabrication of molded articles such as rollers, large diameter pipe and large molded containers.

DESCRIPTION OF THE PREFERRED EMBODIMENTS

The improvement of the present invention is preferably employed in a low pressure polymerization process wherein an α-olefin is pressurized, advantageously in the absence of or at low concentrations of hydrogen, i.e., less than about 40 mole percent based on monomer, in a polymerization zone containing an inert liquid diluent in a two-component catalyst composition of a type commonly known as a Ziegler catalyst. This improved process is carried out under an atmosphere of gaseous monomer being polymerized.

α-Olefins which are suitably polymerized or copolymerized in the practice of this invention are generally the α-olefins having from 2 to 4 carbon atoms such as ethylene, propylene, butene-1, and the like.

It is understood that such α-olefins may be copolymerized with each other and/or with small amounts, i.e., up to about 10 weight percent based on the polymer, of other ethylenically unsaturated monomers such as butadiene, isoprene, and styrene.

The catalyst is suitably any catalyst of the Ziegler type. Preferably, the catalyst is essentially the reaction product of (1) an organo-metallic reducing compound corresponding to the formula $MR_nX_m$ wherein M is the metal of a group 1a, 2a or 3a of Mendeleev's Periodic Table of Elements, R is an alkyl group having from 1 to 8 carbon atoms, X is hydrogen or halogen, and n plus m is a positive whole number corresponding to the number of valence electrons of M wherein $n$ is 1, 2 or 3 and $m$ is 0, 1 or 2 and (2) a reducible transition metal compound including the halides, oxyhalides, acetates, alkoxides, benzoates, and acetyl acetonates of the Group 4b, 5b, 6b, 7b and 8 metals of Mendeleev's Periodic Table of Elements. Furthermore, it is understood that the catalyst is suitably a supported catalyst wherein the catalyst is deposited on a solid inorganic or polymeric particulate. Similarly, it is understood that additional modifiers, adjuvants, etc. may also be employed in addition to the essential components of the catalyst.

Examples of suitable organo-metallic compounds include the aluminum trialkyls, e.g., aluminum triethyl, aluminum triisobutyl, aluminum tripropyl, aluminum diethylpropyl, other aluminum trialkyls wherein alkyl has from 1 to 8 carbon atoms; aluminum alkyl hydrides, e.g., aluminum diethylhydride and aluminum isobutyl-dihydride; aluminum alkylhalides, e.g., diethyl aluminum chloride, diethyl aluminum bromide, ethyl aluminum dichloride and the like; magnesium dialkyls; zinc dialkyls; alkali metal alkyls and hydrides; alkali metal aluminum hydrides; and other hydrides and alkyls of Group 1, 2 and 3 metals wherein the alkyl groups contain 1 to 8 carbon atoms. Preferred organo-metallic compounds are the aluminum trialkyls, especially aluminum triethyl and aluminum triisobutyl, and the aluminum alkylhalides, especially diethyl aluminum chloride.

Representative reducible transition metal compounds include the halides, oxyhalides, alcoholates, alkoxides and esters of the Group 4b, 5b, 6b, 7b and 8 transition metals of Mendeleev's Periodic Table of Elements, i.e., titanium, vanadium, chromium, iron, manganese, cobalt and nickel. Example of such components include reducible titanium halides such as titanium tetrachloride, titanium trichloride, titanium tetrabromide, titanium tetraiodide and the like; reducible vanadium halides and oxyhalides such as vanadium pentachloride and vanadium oxytrichloride; titanium tetramethoxide, titanium triethoxide, tripropoxytitanium chloride, titanium acetylacetonate, titanium tetraacetate, chromium acetylacetonate, iron acetylacetonate, and similar compounds of the above mentioned transition metals. Preferred transition metals are titanium tetrachloride, titanium trichloride and titanates such as dibutoxytitanium dichloride and tetrapropoxy titanium.

While the aforementioned catalysts can be prepared in a variety of procedures, a simple and effective method is to add the transition metal component to the organo-metallic reducing component, or vice versa, preferably in the presence of an inert organic solvent. It is generally desirable to further activate the catalyst by washing it with inert diluent to remove organic soluble impurities and then combine the washed catalyst with additional organometallic compound such as aluminum triisobutyl.

Suitable inert organic solvents are organic materials which are inert to the catalyst and which are liquid under polymerization conditions such as liquefied ethane, propane, isobutane, n-butane, hexane, the various isomeric hexanes, isooctane, cyclohexane, methylcyclopentane, dimethylcyclohexane, dodecane, industrial solvents composed of saturated and/or aromatic hydrocarbons, such as kerosene, naphthas, etc., especially when freed of any olefin compounds and other impurities and especially those ranging in boiling point from 150° up to 600°F. Also included are toluene, benzene, ethylbenzene, cumene, decahydronaphthalene and the like.

Suitable inert gases employed in the practice of this invention include nitrogen, argon, helium, and the other stable inert gases of Group 0 of the periodic table of elements with nitrogen being preferred. It is recognized, however, that any gas which can be absorbed by the catalyst without reacting with it is also suitable.

In the low pressure polymerization process, i.e., usually up to about 100 atmospheres, polymerization is effected by adding to a polymerization zone containing monomer, a catalytic amount of the above reaction product, the inert gas and inert organic diluent in any order of addition, and subsequently heating the zone to temperatures conducive to slurry polymerization, preferably in the range from about 60° to about 90°C. It is generally desirable to carry out polymerization in absence of moisture and air. Catalytic amounts of the aforementioned catalysts can range from as low as 0.001 weight percent based on total weight of monomers charged to as high as 1.0 weight percent. While preferred amounts vary with the polymerization conditions such as temperature, pressure, solvent, presence of catalyst poisons, etc., generally preferred concentrations of the catalyst range from about 0.005 to about 0.01 weight percent. The inert gas is preferably employed in an amount which is sufficient to measurably retard the polymerization rate but which is generally less than the maximum amount of inert gas which is soluble in the inert organic diluent at the polymerization conditions to be employed. While specific amounts of the inert gas to be employed will vary with the particular inert gas and the inert diluent, the inert gas is generally employed in amounts ranging from at least 20 parts per million based on the inert diluent up to and including the maximum amount of the inert gas that can be dissolved in the inert diluent in the reactor. As an example, when nitrogen is employed as the inert gas and hexane as the inert diluent, a suitable amount of nitrogen is in the range from about 100 to about 10,000 parts per million based on inert diluent, with the preferred range being between about 1000 and about 8000 ppm, especially from about 1500 to about 2000 ppm. In the case of helium and hexane being employed as the inert gas and inert diluent, respectively, a suitable amount of helium is in the range from about 20 to about 1000 ppm based on hexane with the preferred amount of helium being in the range from about 50 to about 500 ppm. As a more general rule, the amount of inert gas employed is within the range from about 60 to 100 weight percent of the maximum amount of inert gas that can be dissolved in the inert diluent.

In practice of preferred embodiments, it is advantageous to employ continuous feed stream addition of monomer, catalyst, inert diluent and inert gas to the reactor while continuously withdrawing polymer as it is formed. Accordingly, the first step in the procedure is to add the required amount of inert gas to the vapor space of the reactor at a constant flow rate. Hexane or other suitable diluent is also added to the reactor at a rate required for purposes of the polymerization and to insure that an excess of inert gas does not develop during the polymerization. Upon equilibration of the inert gas and inert diluent flows, the monomer and catalyst feed streams are begun and continued during the polymerization.

While hydrogen is generally employed in the practice of conventional low polymerization processes to control molecular weight and inherently act as a macromolecular heat transfer means, it is not required in the practice of the present invention. Accordingly, hydrogen is optionally employed only when it is desirable to obtain a lower molecular weight polymer. Thus, when lower molecular weight polymers are desired, it is beneficial to employ hydrogen in concentrations ranging from about 10 to about 70 mole percent, based on the monomer. The use of larger amounts of hydrogen will so limit the rate of polymerization that the use of inert gas is no longer required and therefore such amounts are outside the scope of the present invention. It is to be understood that when used, hydrogen can be added with a monomer stream to the polymerization vessel or separately to the vessel before, during or after addition of the monomer to the polymerization vessel.

The monomer or mixture of monomers is contacted with the above described catalyst in any convenient manner, preferably by bringing the catalyst and monomer together with intimate agitation provided by suitable stirring or other means. Agitation should be continued during the polymerization to provide adequate contact of catalyst and monomer. Further, in the case of more rapid reactions with more active catalysts, means should be provided for dissipating the exothermic heat of polymerization. Suitably this is achieved by compression, cooling, and return of the unreacted monomer, hydrogen, if any, and inert gases to the polymerization zone or by circulation of a coolant through the jacket of the polymerization vessel or through internal cooling coils. As noted hereinbefore the polymerization can be effected in a continuous manner as well as in a batch process. Preferably polymer is removed from the reactor by passing reaction mixture through an equilibrium overflow valve or a series of the same.

The resulting polymer can be recovered from the total reaction mixture by a wide variety of procedures, chosen in accordance with the properties of the particular polymer, the particular diluent and catalyst. It is generally quite desirable to remove as much catalyst from the polymer as possible and this is conveniently done by contacting the total reaction mixture or the polymer after separation from the reaction mixture with methanolic hydrochloric acid, with an aliphatic alcohol such as methanol, isobutanol, isopropanol, or by various other procedures. Removal of liquid diluent from the polymer is suitably accomplished by evaporation of the diluent, care being taken to avoid subjecting the polymer to excessive temperature in such operation. Such diluent removal and final drying of the polymer is advantageously effected at reduced pressures and at temperatures below 300°C.

The following example is given to illustrate the invention and should not be construed as limiting its scope. All parts and percentages are by weight unless otherwise indicated. The symbol $I_2$ represents the melt flow viscosity in decigrams per minute of the polymer measured according to ASTM D-1238-65T(E).

EXAMPLE

A run (identified as Run No. 1 in Table I) is conducted in accordance with the improved process of the present invention by the following procedure:

Preparation of Catalyst

Twenty-four pounds of a 25 weight percent solution of diethyl aluminum chloride in hexane is added at a rate of 8 pounds per hour to 36 pounds of a 25 weight percent hexane solution of titanium tetrachloride in a 10 gallon, jacketed stainless steel reactor having an inside diameter of 12 inches and a length of 3 feet and equipped with a filtering and stirring mechanism. Addition of the diethyl aluminum chloride is carried out in a dry, oxygen-free nitrogen atmosphere at temperature of 35°C. and at agitation rate of 350 rpm, whereby a slurry of hexane insoluble catalyst component is formed. This slurry is filtered under nitrogen atmosphere using the filtering mechanism of the reactor and washed with fresh hexane to remove hexane-soluble materials. The washed catalyst component which contains titanium trichloride was redispersed in hexane to a 10 millimolar concentration thereof.

Polymerization

Into a 200 gallon, jacketed stainless steel reactor having an inside diameter of 36 inches and a length of 36 inches and equipped with stirring mechanism consisting of a 2 inch shaft 30 inches long with one 18 inches turbine driven by a 7½ horsepower motor, and a level-activated dump valve for the intermittent withdrawal of polymer slurry is charged 135 pounds of hexane. The reactor is heated to 85°C and pressured to 100 psig by adding ethylene and hydrogen. Hydrogen is added at a rate of 0.33 pound per hour. The 10 millimolar dispersion of washed titanium containing catalyst component in hexane and a 10 millimolar solution of triisobutyl aluminum and hexane are fed into the reactor at a rate of 15 pounds per hour of each. Normal hexane is pumped into the reactor at a rate of 135 pounds per hour with nitrogen being added at a rate of 0.25 pound per hour to maintain the concentration thereof of 1850 parts per million based on the hexane. The feeding of ethylene into the reactor is begun after 20 pounds of combined titanium containing component dispersion in triisobutyl aluminum solution have been added to the reactor at a flow rate which is increased as pressure and temperature permit to 45 pounds per hour. The polymerization mixture is agitated at a rate of 180 rpm. During polymerization, nitrogen comprises 6.0 mol percent of the gas phase with the hydrogen comprising about 12 mol percent. The balance of the gas phase is essentially ethylene with trace amounts of vaporized hexane. Polymer product in the form of a slurry is intermittently removed from the top of the reactor through the level activated dump valve to a vessel for deactivating catalyst and recovering hexane. Catalyst is deactivated with water and volatile materials are removed by steam distillation.

The wet polymer is flash dried to less than 0.10 percent volatiles. The density and melt flow viscosity ($I_2$) for the resultant polymer are determined to be 0.960 gram/cm³ and 0.10 decig/min.

An additional run (Run No. 2) is carried out generally in accordance with the foregoing procedure except that helium is employed as inert gas.

For the purposes of comparison and to show the advantages of the present invention, a control run (identified in Table I as Run No. C) is also carried out essentially as Run No. 1 except that nitrogen is not employed in the reactor. The density and melt flow viscosity are similarly determined for the resultant product and the results are recorded in Table I. Following 8 hours of operation in the control run the reactor fouls to the point that the reaction must be stopped to clean the reactor.

Table I

| Run No. | Inert Gas Type | Conc., ppm (1) | Density, g/cc | Melt Flow Viscosity, decig/min (2) | Reactor Buildup Amount | Time, hrs. |
|---|---|---|---|---|---|---|
| 1 | $N_2$ | 1850 | 0.960 | 0.10 | Slight | 240 |
| 2 | He | 112 | 0.960 | 0.10 | Slight | 240 |
| C* | None | 0 | 0.960 | 0.10 | Severe | 8 |

*Not an example of the invention.
(1) Concentration of inert gas in the liquid phase of the polymerization reactor.
(2) Determined by ASTM D-1238-65T(E).

What is claimed is:

1. A process for polymerization in a polymerization zone α-olefin in the presence of a catalytic amount of a Ziegler catalyst in an inert liquid diluent which comprises the steps (1) introducing into the polymerization zone an inert gas in an amount sufficient to effect macromolecular heat transfer in the liquid phase of the polymerization zone but not in excess of the capacity of the diluent to solvate the gas and (2) polymerizing the α-olefin.

2. The process of claim 1 wherein the inert gas is nitrogen in an amount in the range from about 100 to 10,000 parts per million based on the inert diluent.

3. The process of claim 1 wherein the inert gas is helium in an amount in the range from about 20 to about 1000 parts per million based on the inert diluent.

4. The process of claim 2 wherein the α-olefin is ethylene or a mixture of ethylene and another α-olefin and the catalyst contains the reaction product of an alkyl aluminum compound and a titanium halide.

5. The process of claim 4 wherein the α-olefin is a mixture of ethylene and butene-1 and the catalyst is aluminum triisobutyl and the reaction product of diethyl aluminum chloride and titanium tetrachloride.

6. The process of claim 1 for polymerizing the α-olefin in a reactor to form a polymer having a melt flow viscosity as determined by ASTM-D-1238-65T(E) less than 0.3 decigram/minute without fouling the reactor.

* * * * *